United States Patent
Setina et al.

(10) Patent No.: US 11,498,488 B2
(45) Date of Patent: Nov. 15, 2022

(54) VEHICLE PARTITION FOR SINGLE PASSENGER AND SECURE STORAGE AREA

(71) Applicant: J.R. Setina Manufacturing Co., Olympia, WA (US)

(72) Inventors: Terry L. Setina, Olympia, WA (US); Adam Sampson, Tenino, WA (US)

(73) Assignee: J.R. Setina Manufacturing Co., Olympia, WA (US)

( * ) Notice: Subject to any disclaimer, the term of this patent is extended or adjusted under 35 U.S.C. 154(b) by 0 days.

(21) Appl. No.: 17/143,917

(22) Filed: Jan. 7, 2021

(65) Prior Publication Data

US 2021/0206321 A1 Jul. 8, 2021

Related U.S. Application Data

(60) Provisional application No. 62/958,567, filed on Jan. 8, 2020.

(51) Int. Cl.
*B60R 5/04* (2006.01)
*B60R 21/02* (2006.01)
*B60R 7/02* (2006.01)

(52) U.S. Cl.
CPC ............ *B60R 5/044* (2013.01); *B60R 7/02* (2013.01); *B60R 21/026* (2013.01)

(58) Field of Classification Search
CPC .......... B60R 5/044; B60R 5/041; B60R 7/02; B60R 7/04; B60R 7/043; B60R 21/026; B60R 21/12
USPC ............................... 296/24.46, 24.42, 24.44
See application file for complete search history.

(56) References Cited

U.S. PATENT DOCUMENTS

| | | | | |
|---|---|---|---|---|
| 3,345,118 A | * | 10/1967 | Cummings | B60N 3/002 312/235.8 |
| 5,951,128 A | * | 9/1999 | Aidone | B60R 7/043 312/235.8 |
| 5,992,884 A | * | 11/1999 | Gillespie | B60R 22/00 297/483 |
| 6,015,198 A | * | 1/2000 | Stair | B60R 7/043 297/188.11 |
| 7,195,297 B2 | * | 3/2007 | Murray | B60R 7/14 296/24.42 |
| 8,056,978 B2 | * | 11/2011 | Shivers | B60N 2/0284 297/118 |
| 8,651,351 B2 | | 2/2014 | Fowler et al. | |

(Continued)

FOREIGN PATENT DOCUMENTS

| | | | | |
|---|---|---|---|---|
| DE | 102012104569 A1 | * | 6/2013 | ............... B60R 7/04 |
| EP | 1787856 A1 | * | 5/2007 | ........... B60N 2/3022 |
| FR | 2989336 A1 | * | 10/2013 | ............... B60R 7/02 |

*Primary Examiner* — Jason S Morrow
*Assistant Examiner* — Wenwei Zhuo
(74) *Attorney, Agent, or Firm* — Klarquist Sparkman, LLP (57) ABSTRACT

A partition assembly for a vehicle can include a partition member, a platform member, and a drawer. The partition member can extend along a first axis, have a first side surface and a second side surface, and define a storage area and a prisoner area. The platform member can be coupled to the first side surface of the partition member and can extend from the partition member along a second axis perpendicular to the first axis. The drawer can be coupled to the platform member and can be slidable between an open position and a closed position along the second axis.

20 Claims, 12 Drawing Sheets

(56) References Cited

U.S. PATENT DOCUMENTS

| | | | | |
|---|---|---|---|---|
| 8,720,991 B2* | 5/2014 | Macleod | ............... | B60R 7/043 |
| | | | | 297/188.2 |
| 2002/0005649 A1* | 1/2002 | Hofmann | ............... | B60R 7/043 |
| | | | | 297/188.1 |
| 2004/0251704 A1* | 12/2004 | Rubel | ............... | B60R 7/02 |
| | | | | 296/37.6 |
| 2007/0131729 A1* | 6/2007 | Kopf | ............... | B60R 7/02 |
| | | | | 224/400 |
| 2012/0048903 A1* | 3/2012 | Fowler | ............... | B60R 5/04 |
| | | | | 224/488 |
| 2015/0203046 A1* | 7/2015 | Nedelman | ............... | B60R 7/02 |
| | | | | 296/37.7 |
| 2019/0352087 A1* | 11/2019 | Williams | ............... | B60R 7/043 |
| 2020/0031303 A1* | 1/2020 | Reynolds | ............... | B60R 21/12 |
| 2020/0254936 A1* | 8/2020 | Razvi | ............... | E05B 83/32 |

* cited by examiner

VEHICLE PARTITION FOR SINGLE PASSENGER AND SECURE STORAGE AREA

CROSS REFERENCE TO RELATED APPLICATION

This application claims the benefit of U.S. Provisional Application Ser. No. 62/958,567, entitled VEHICLE PARTITION FOR SINGLE PASSENGER AND SECURE STORAGE AREA, filed on Jan. 8, 2020, which is incorporated by reference herein.

BACKGROUND

Partitions for passenger vehicles typically are used to separate the interior space of a vehicle into separated areas for different uses. According to one common type of partition used in law enforcement vehicles, the rear occupant area (typically suited for two passengers) is separated from the front occupant area (typically suited for a driver and a passenger) by a partition. This type of partition separates one or two law enforcement officers seated in the front seat area from one, two or sometimes three rear seat occupants, such as suspects, prisoners, and other individuals, thereby reducing the risks of injury to the law enforcement officers from the rear seat occupants, as well as restricting the ability of the rear seat occupants to escape from the vehicle.

Additionally, law enforcement officers often have a variety of equipment and other gear, which must be typically be stored in a secure location within the vehicle such that it cannot be accessed by non-law enforcement officers. In some vehicles, it may be desirable to store such gear in the cab portion of the vehicle, such as in the rear occupant area. However, such gear must also be secured such that it cannot be accessed by a rear seat passenger. Accordingly, a need exists for improved vehicle partitions that provide for one or more secure storage areas.

SUMMARY

Described herein are embodiments of a vehicle partition for single passenger and secure storage areas. The described partitions can be used to separate a rear seat occupant (e.g., a passenger, suspect, and/or prisoner) from a storage area located adjacent the rear seat occupant.

In a representative embodiment, a partition assembly can comprise a partition member, a platform member, and a drawer. The partition member can extend along a first axis and have a first side surface and a second side surface. The partition member can define a storage area and a prisoner area. The platform member can be coupled to the first side surface of the partition member and can extend from the partition member along a second axis perpendicular to the first axis. The drawer can be coupled to the platform member and can be slidable between an open position and a closed position along the second axis.

In some embodiments, the platform member can be a first platform member and the assembly can further comprise a second platform member coupled to and extending from the first side surface of partition member along the second axis. The second platform member can be spaced apart from the first platform member along the first axis to define an obscured storage area between them.

In some embodiments, the partition assembly can be disposed in a rear occupant area of the vehicle.

In some embodiments, the partition assembly can further comprise a communications housing coupled to the platform member and defining an inner storage area. In such embodiments, a movable panel can be pivotably coupled to the communications housing, the movable panel being movable between an open position and a closed position, wherein when the movable panel is in the open position the inner storage area can be accessed. In some embodiments, the movable panel comprises one or more latches configured to selectively retain the movable panel in the closed position.

In some embodiments, the drawer further comprises a locking mechanism configured to selectively retain the drawer in the closed position.

In some embodiments, the partition assembly further comprises one or more flanges configured to allow the partition assembly to be coupled to the vehicle via one or more fasteners.

In some embodiments, the partition member can comprise one or more vents extending through a thickness of the partition member. In such embodiments, the partition assembly can comprise one or more vent covers configured to prevent a passenger seated in the prisoner area from accessing the storage area while allowing air to flow through the one or more vents between the storage area and the prisoner area.

In some embodiments, the platform member can comprise one or more cutouts configured to allow the platform member to conform to contours of one or more interior features of the vehicle.

In some embodiments, the partition member can comprise polycarbonate. In some embodiments, the partition assembly can further comprise a seat portion coupled to the second side surface of the partition member.

In some embodiments, the drawer can comprise a housing defining a lumen and a slidable member configured to extend at least partially into the lumen. In such embodiments, the housing can comprise a first set of rails and wherein the slidable member comprises a corresponding second set of rails configured to engage the first set of rails.

In another representative embodiment, a partition assembly for use in a vehicle having a front occupant area and a rear occupant area and comprising a first rear area door on a driver-side of the vehicle and a second rear area door on a passenger-side of the vehicle, the first and second rear area doors being movable between a closed position and an open position, can comprise a partition member, a platform member, and a drawer. The partition member can be configured to extend between a driver-side portion and a passenger-side portion of the rear occupant area and between a floor and a ceiling of the vehicle in a vertical direction. The platform member can be coupled to the partition member and configured to extend horizontally between the partition member and a first side of the vehicle comprising the first rear door. The drawer can be coupled to the platform member and can be movable between a closed position and an open position. The drawer can be configured such that when the drawer and the first rear door are in the open position the drawer does not contact the first rear door.

In some embodiments, the platform member can be a first platform member and the partition assembly can further comprise a second platform member coupled to the partition member and spaced apart from the first platform member in the vertical direction. The second platform member can be configured to extend horizontally between the partition member and the first side of the vehicle. In such embodiments, the first and second platform members can define a first storage area between them and a second storage area between the second platform member and the ceiling of the vehicle. The first storage area can be positioned such that a person looking in through a window of the vehicle cannot see into the first storage area.

In some embodiments, the partition assembly can further comprise a communications housing coupled to the platform member and extending toward the ceiling of the vehicle, the communications housing defining an inner storage area. In such embodiments, the communications housing can further comprise a movable panel configured to move between an open position and a closed position. When the movable panel is in the open position the inner storage area can be accessible from an interior of the vehicle.

The foregoing and other features, and advantages of the disclosure will become more apparent from the following detailed description, which proceeds with reference to the accompanying figures.

DETAILED DESCRIPTION

Described herein are embodiments of a partition assembly for use in a vehicle. Though some of the below embodiments are described with respect to vehicles having a particular combination of features (for example, a front occupant area, a rear occupant area, and a cargo area such as a flatbed), it should be understood that the described partition assemblies can be used with any type of vehicle.

The described partition assemblies can be used in combination with one or more additional partitions, such as partitions that separate the front occupant area from the rear occupant area. Additional details of such partitions can be found, for example, in U.S. Pat. No. 8,708,388, which is incorporated by reference herein in its entirety.

Figure 1:
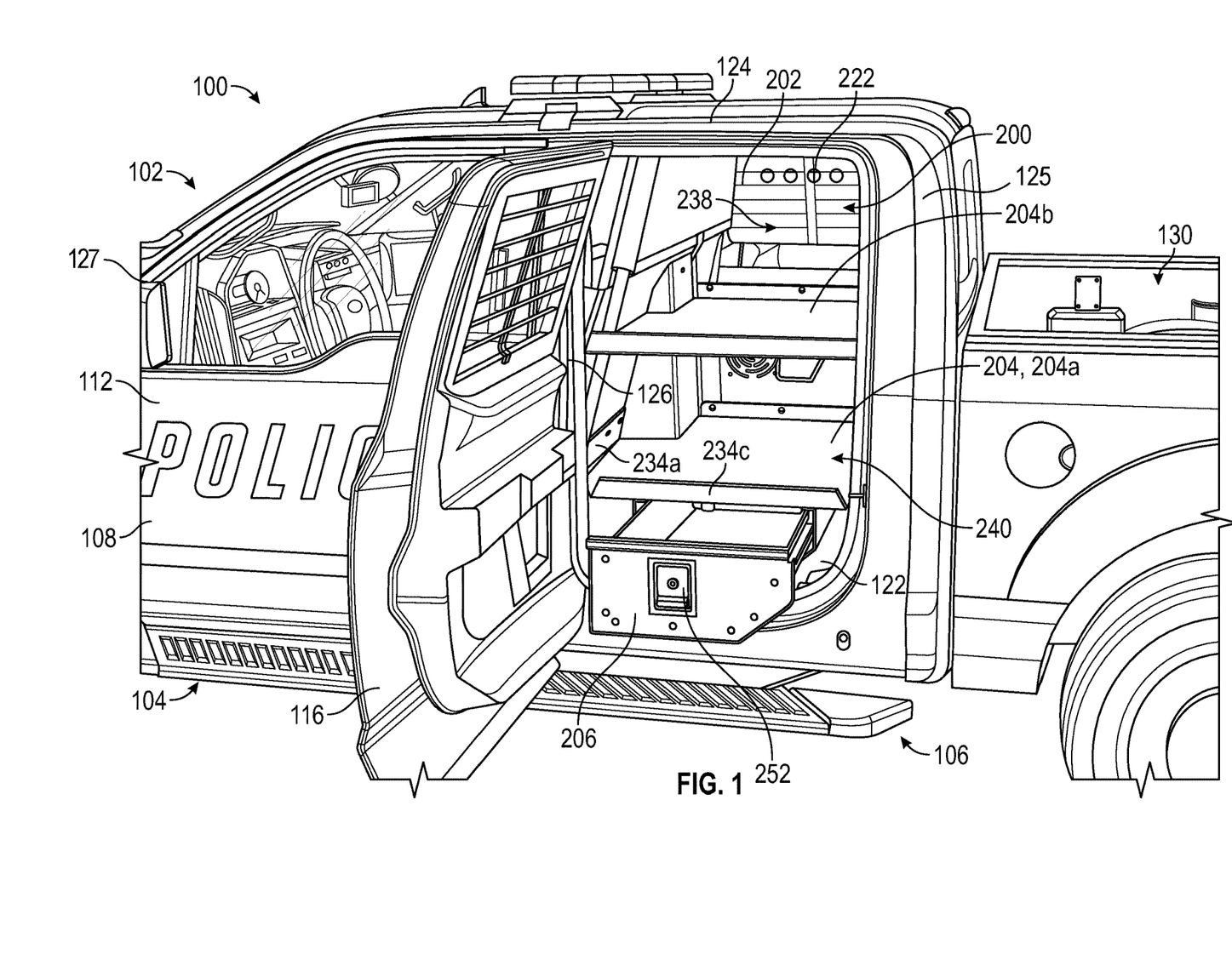
FIG. 1 is a perspective view of an exemplary embodiment of a partition assembly installed in an exemplary vehicle.

FIG. 1 illustrates an exemplary vehicle 100 in which a partition assembly such as partition assembly 200 (see FIGS. 2-10) can be installed. The vehicle 100 can include a passenger compartment or cab 102 having a front occupant area 104 and a rear occupant area 106. The vehicle 100 can include a first side portion 108 (also referred to as the driver-side portion), and a second portion 110 (see FIG. 12, also referred to as the passenger-side portion). The front occupant area 104 can have a first door 112 and a second or passenger-side door 114 (see FIG. 12). The front occupant area 104 can comprise a driver seat 113 and a passenger seat 115 (see FIG. 12). The rear occupant area can have a first door 116 and a second door 118 (see FIG. 12). The rear occupant area 106 can comprise one or more passenger seats (see e.g., passenger seat 274 in FIG. 10). The vehicle 100 can further include a floor 122 (FIG. 12) and a ceiling or roof 124 supported by a plurality of pillars such as one or more A-pillars 125, a first B-pillar 126 and a second B-pillar (not shown) disposed adjacent the driver-side portion and the passenger-side portion, respectively, and one or more C-pillars 127.

In some embodiments, such as the illustrated embodiment, the vehicle 100 can include an external cargo area 130 such as a pickup truck bed as shown or a flat-bed. In other embodiments, the vehicle 100 can have an interior cargo area such as a trunk.

In some particular embodiments, the first and second doors 116, 118 of the rear occupant area 106 can be configured to open such that the door extends at approximately a 90 degree angle from the body of the vehicle 100 (e.g., such that the door extends perpendicularly to a longitudinal axis extending along the length of the vehicle). Such embodiments may facilitate opening and closing of one or more storage portions of the partition assembly 200, as described in more detail below.

The partition assembly 200 can be disposed within the cab 102 of the vehicle 100 and generally comprises a partition member, one or more platform members, and one or more storage portions or drawers. FIGS. 1-12 illustrate an exemplary embodiment of a partition assembly 200 including a partition member 202, a first, or lower platform member 204a and a second, or upper platform member 204b (FIG. 1), and one or more drawers 206. The partition member 202 can be configured to define a storage area 201 on one side of the vehicle and a prisoner area 203 on the opposite side (see FIG. 10). In the illustrated embodiment, the storage area 201 is disposed on the driver-side of the vehicle 100 and the prisoner area 203 is on the passenger-side of the vehicle, however, in other embodiments, the storage area may be disposed on the passenger-side of the vehicle and the prisoner area 203 may be disposed on the driver side of the vehicle.

Figure 9:
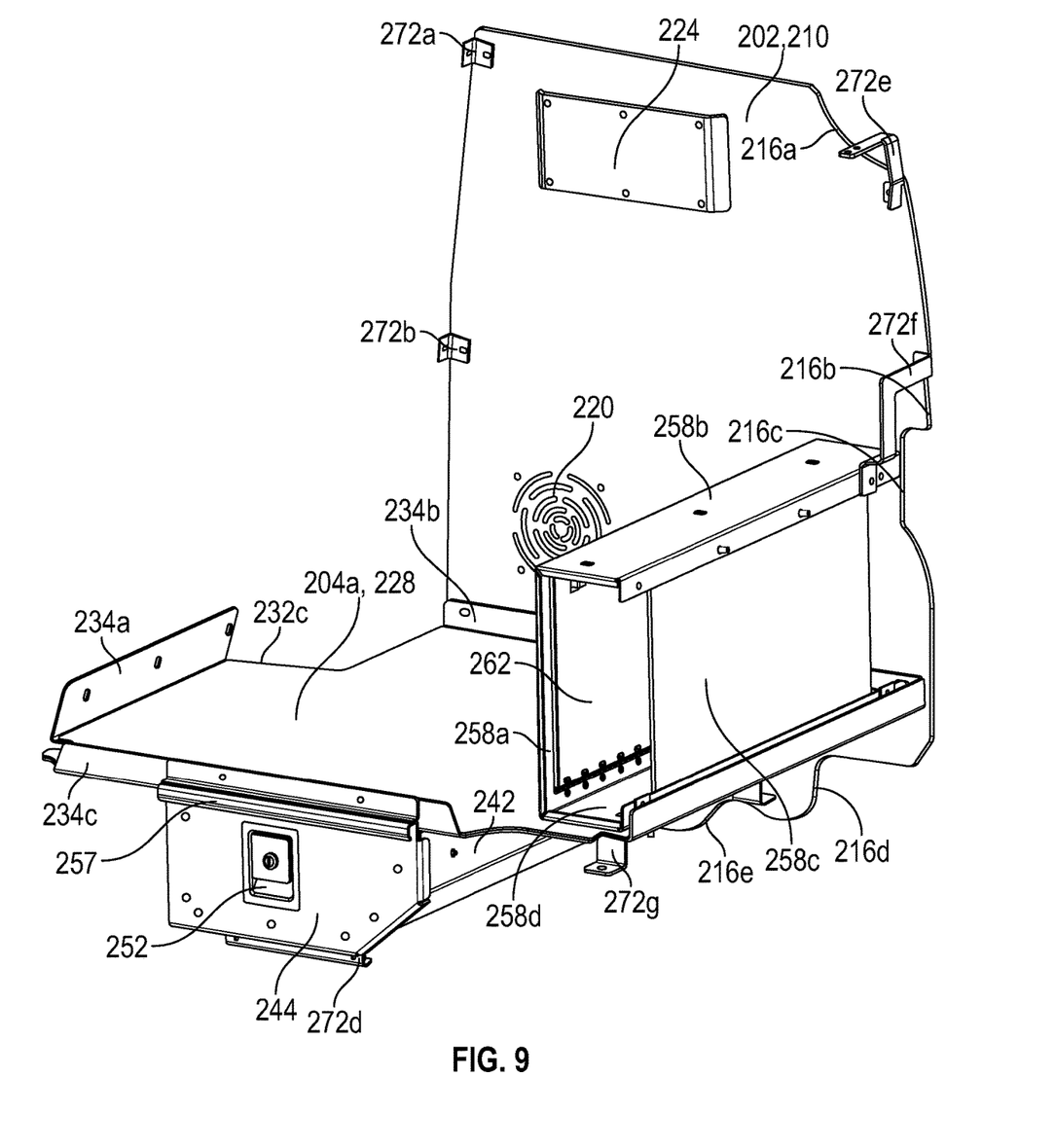
FIG. 9 is a perspective view of the partition assembly of FIG. 1 with the upper platform member removed.
Figure 10:
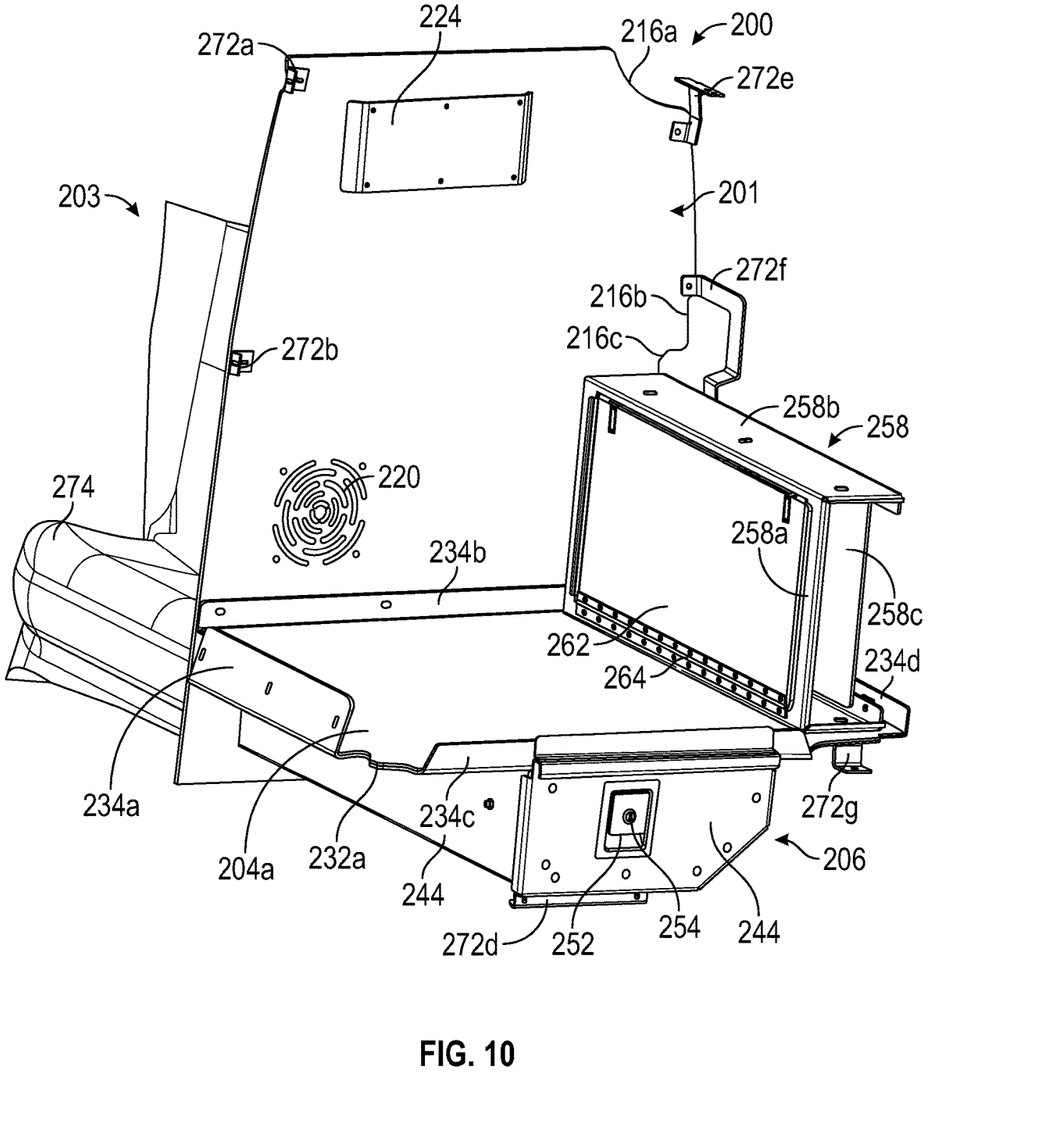
FIG. 10 is a perspective view of the partition assembly of FIG. 1 with the upper platform member removed and positioned adjacent to an exemplary rear occupant seat.
Figure 11:
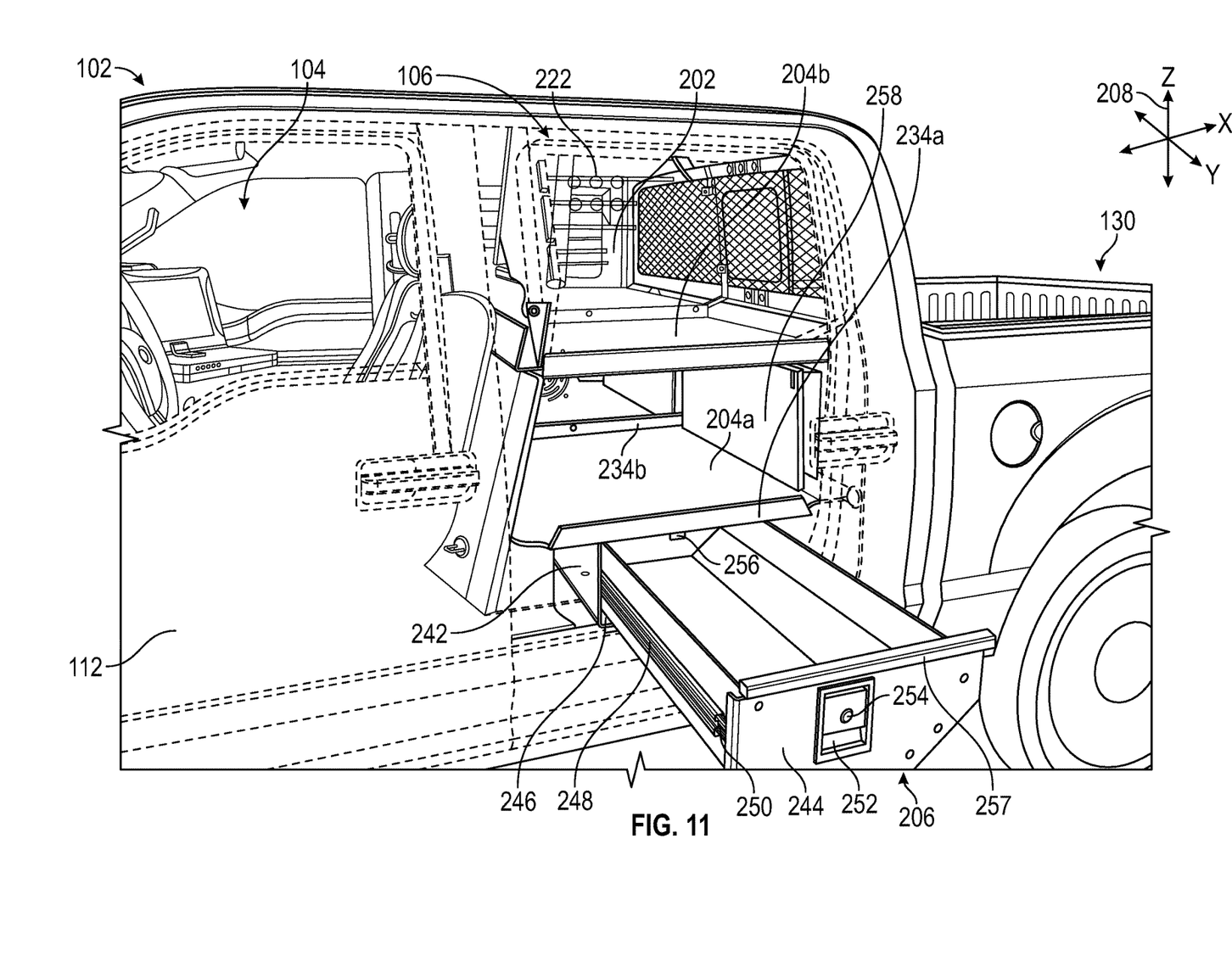
FIG. 11 is a perspective view of the partition assembly of FIG. 1 installed in a vehicle with portions of the vehicle removed for purposes of illustration.
Figure 12:
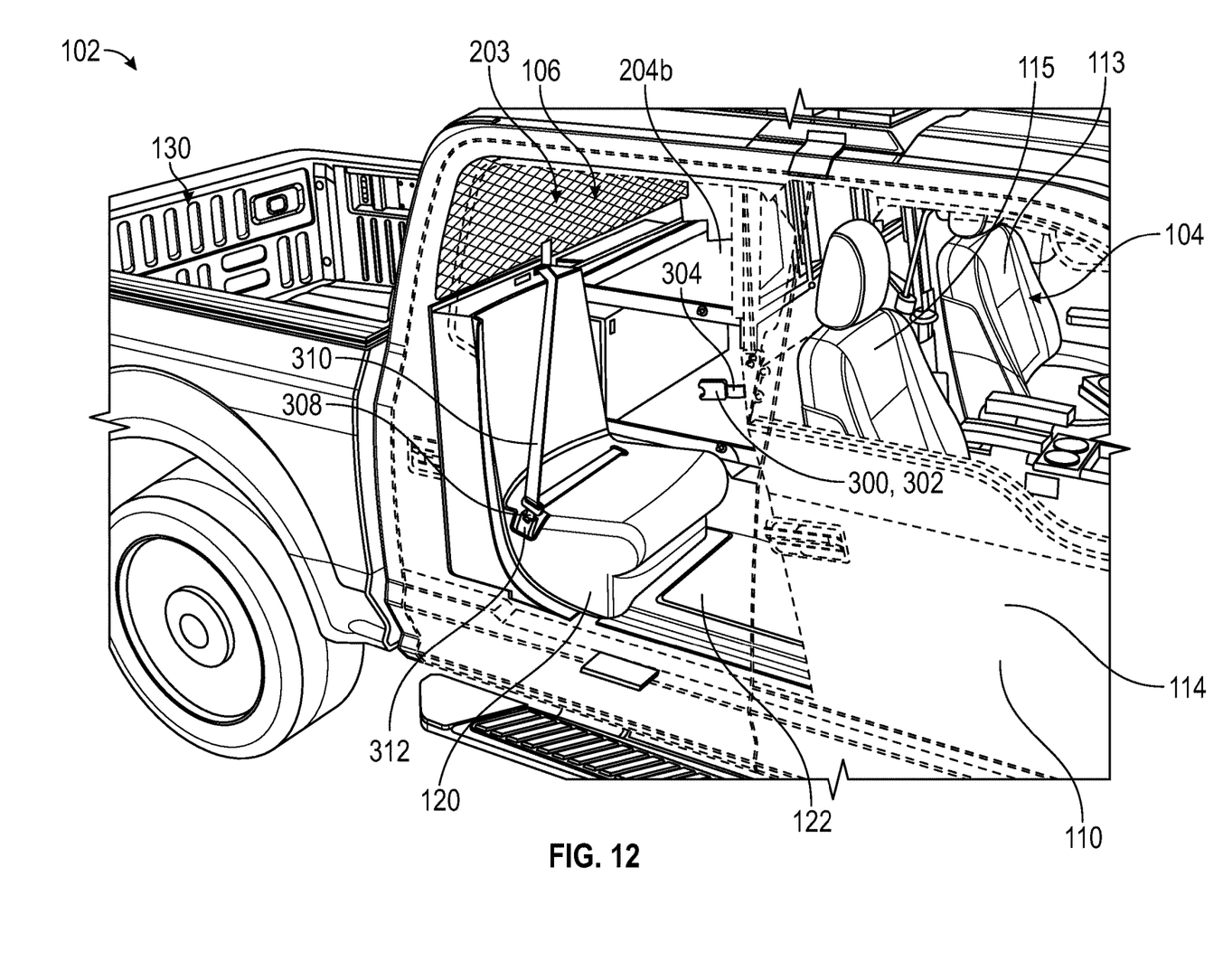
FIG. 12 is a perspective view of the partition assembly of FIG. 1 installed in a vehicle with portions of the vehicle removed for purposes of illustration.

As mentioned, the partition assembly 200 can comprise first and second platform members 204a and 204b, although FIGS. 2-10 omit the second platform member 204b for purposes of illustration. FIGS. 1, 11, and 12 illustrate an embodiment wherein one or more portions of the partition member 202 are transparent and/or translucent and wherein the vent 220 does not comprise a vent cover 224. The other aspects of the partition assembly remain the same.

Figure 2:
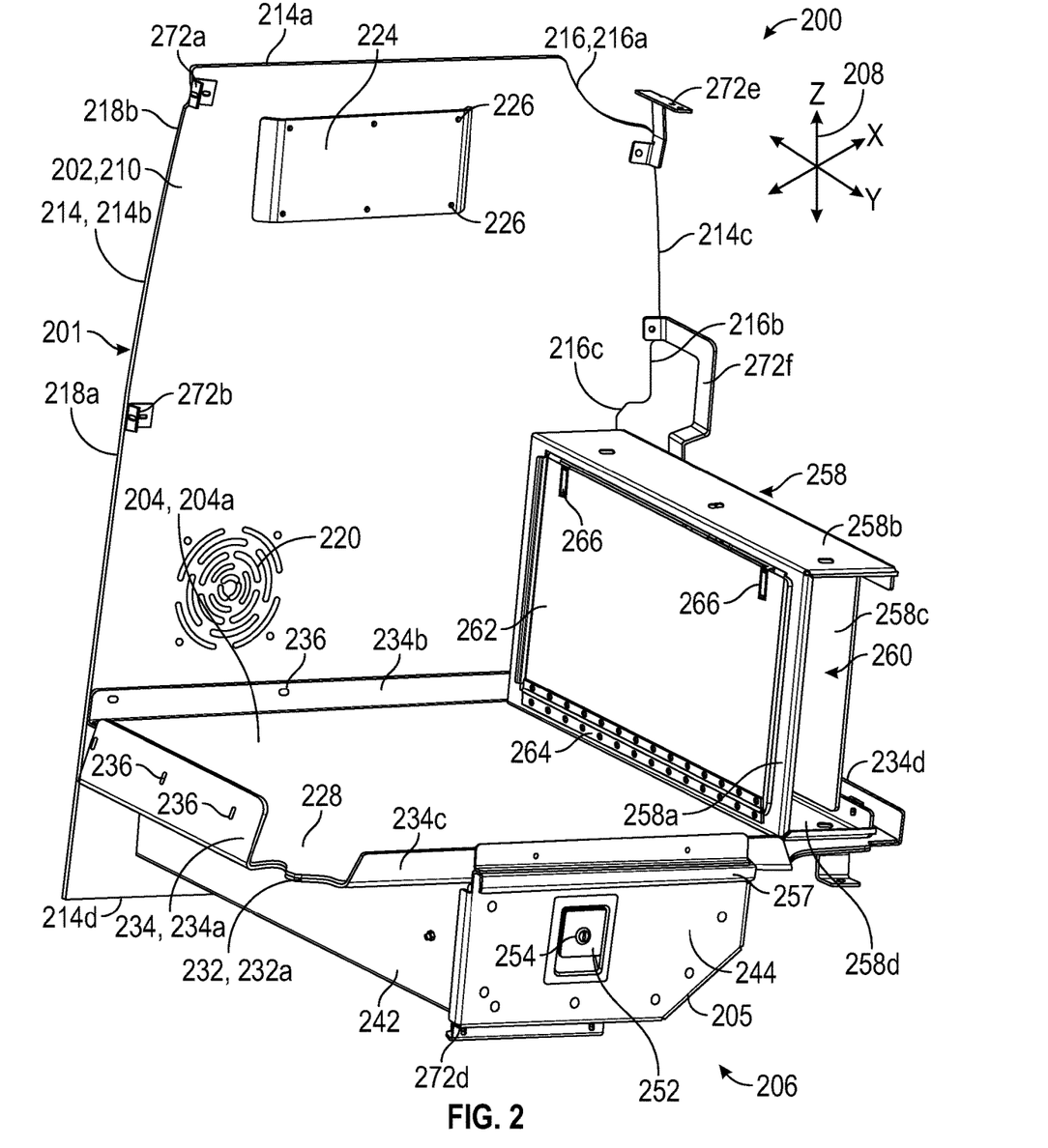
FIG. 2 is a perspective view of the partition assembly of FIG. 1 with the upper platform member removed.

Referring to FIG. 2, the partition member 202 can have a height extending along a first axis (e.g., a Z-axis as shown in coordinate system 208) from an inner surface of the floor 122 (FIG. 1) to an inner surface of the roof 124 (FIG. 1), and a width extending along a second axis (e.g., an X-axis), perpendicular to the first axis. In other words, the partition member 202 can extend vertically between the floor 122 and ceiling 124 of the vehicle in the orientation shown in FIG. 2. The partition member 202 can have a first surface 210 facing the first side 108 (e.g., the driver side) of the vehicle and a second surface 212 (FIG. 3) facing the second side 110 of the vehicle (e.g., the passenger side). The first and second surfaces 210, 212 can be connected by a plurality of edges 214. For example, the partition member 202 can have a top edge 214a, a first side edge 214b, a second side edge 214c, and a bottom edge 214d.

The edge portions 214 can comprise a variety of cutouts 216 and angled portions 218 configured to allow the partition member 202 to be disposed within the pre-existing shape of the vehicle cab. For example, in the illustrated embodiment, as shown in FIG. 2, the top edge 214a can comprise a first cutout 216a at a rear portion thereof, the first side edge 214b can comprise a first angled portion 218a and a second angled portion 218b, the second side edge 214c can comprise a second cutout 216b and a third cutout 216c, and the bottom edge 214d can comprise a fourth cutout 216d and a fifth cutout 216e. Side edge 214b can further comprise an additional semi-circular cutout 216f. However, in other embodiments, the partition member 202 can have any of various cutouts on any of various edges in order to conform to the shape of the vehicle in which it is disposed.

Figure 7:
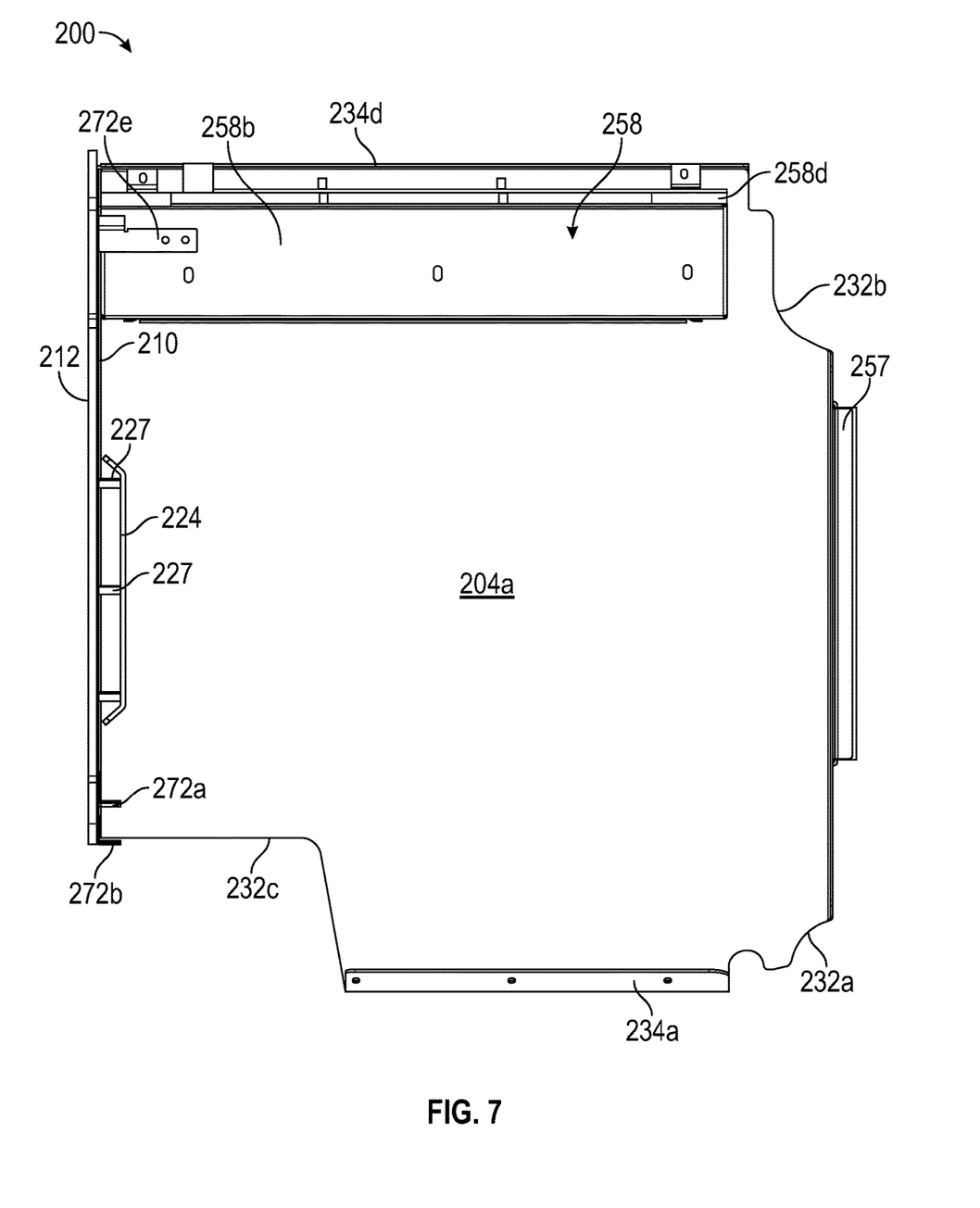
FIG. 7 is a top plan view of the partition assembly of FIG. 1 with the upper platform member removed.
Figure 8:
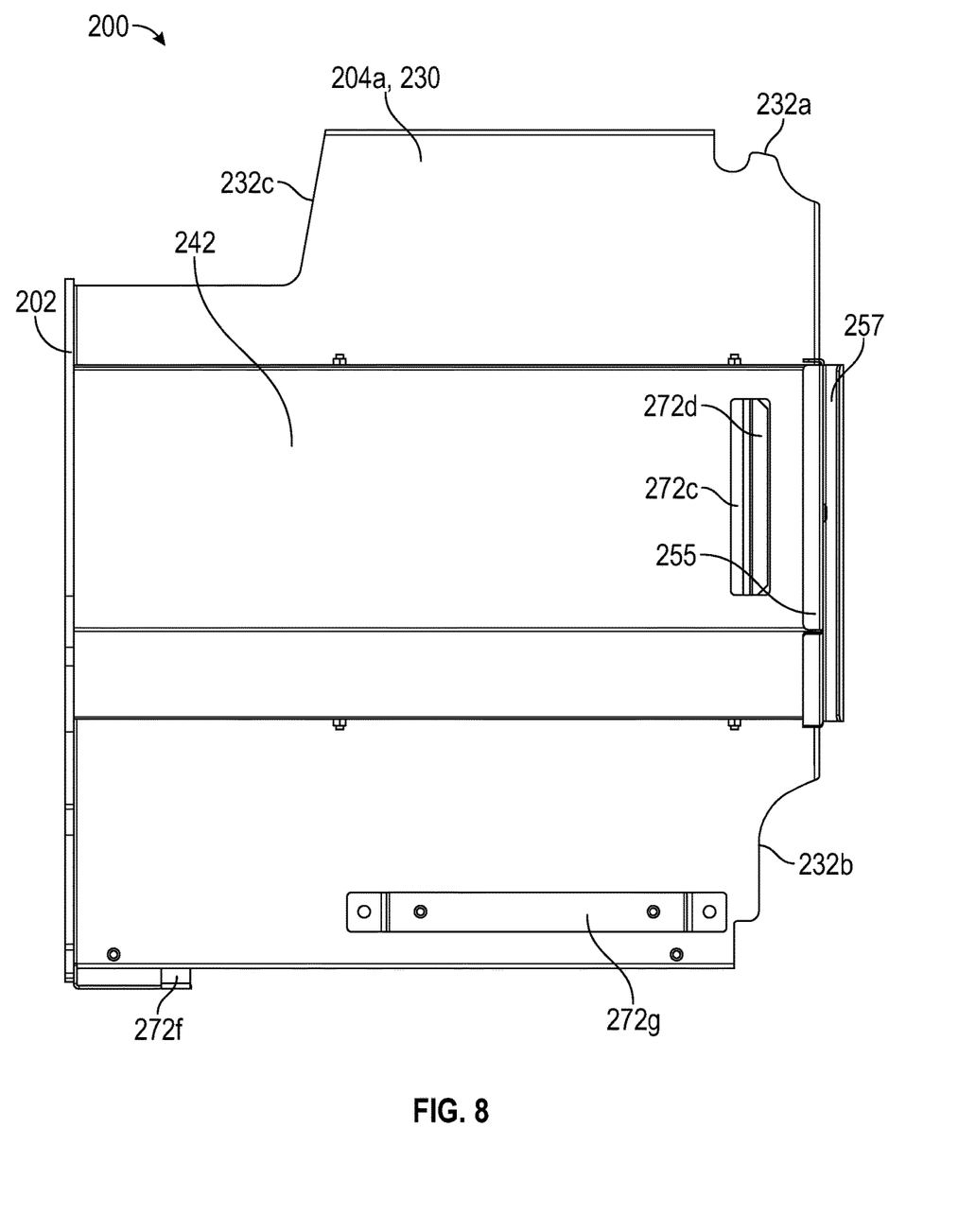
FIG. 8 is a bottom plan view of the partition assembly of FIG. 1.

Optionally, the partition member 202 can further comprise one or more vents comprising a plurality of apertures. The apertures can extend through a thickness of the partition member 202. In other words, the vents can establish airflow communication between the storage area 201 and the prisoner area 203. In the illustrated embodiment, the partition member 202 comprises a first vent 220 and a second vent 222 (see FIG. 6). One or more of the vents 220, 222 can comprise a vent cover such as vent cover 224. The vent cover 224 can be configured to prevent a passenger from reaching through the vent 220, 222 into the storage area 201 while still allowing the flow of air through the partition member 202, and can further prevent prisoners from hiding and/or transferring contraband. The vent cover 224 can be coupled to the partition member 202 using one or more fasteners 226. The fasteners 226 can be any of various fasteners including but not limited to conventional threaded fasteners, such as screws and/or bolts. As shown in FIG. 7, the vent cover 224 can be coupled to the partition member 202 using one or more struts 227. The struts 227 can space the vent cover 224 away from the partition member 202, facilitating the flow of air through the vent.

In some embodiments, the partition member 202 can comprise one or more partially transparent or translucent portions (see e.g., FIGS. 1 and 11-12). For example, the partition member 202 can comprise a polycarbonate, such as a coated, scratch resistant polycarbonate. In some embodiments, some or all of the partition member can comprise steel. In some embodiments, the partition member can additionally comprise a covering (e.g., bars, a screen, mesh, or other covering) comprising vinyl coated expanded metal and/or coated polycarbonate. In still other embodiments, the partition member 202 can be formed from and/or include any of various known barrier materials, such as wire mesh and/or sheet metal.

As mentioned previously, the partition assembly 200 can include one or more platform members 204. Referring again to FIG. 1, the illustrated embodiment comprises a first, or lower platform member 204a, and a second, or upper platform member 204b. Each platform member 204 can extend laterally from the first surface 210 of the partition member 202 along a third axis perpendicular to the first and second axes (e.g., a Y-axis as shown by coordinate system 208) toward the first door 116 (e.g., the passenger-side door) of the rear occupant area 106. Each platform member 204 can have a first, upper surface 228 and a second, lower surface 230 (see FIG. 3).

As shown in FIG. 2, each platform member 204 can have a substantially rectangular shape comprising one or more cutouts 232. The cutouts 232 can be configured to allow each platform member 204 to conform to the interior shape of the vehicle 100. For example, as seen in FIG. 7, platform member 204a can have a first cutout 232a can be configured to allow the first door 116 of the rear occupant area 106 to open and close, and a second cutout 232b configured to accommodate additional features of the vehicle 100. Platform member 204a can further comprise a third cutout 232c configured to allow the partition assembly 200 to be used together with one or more additional partitions, such as partitions that separate the front occupant area 104 from the rear occupant area 106. Additional details of such partitions can be found, for example, in U.S. Pat. No. 8,708,388.

Referring again to FIG. 2, each platform member 204 can have one or more flanges 234. The flanges 234 can extend from the first surface 228 in a substantially vertical direction. In some embodiments, the flanges 234 can be angled. For example, in the illustrated embodiment, platform member 204a has four flanges 234 configured as a front flange 234a, first side flange 234b, second side flange 234c, and rear flange 234d, respectively. Flange 234a is angled into the rear occupant area 106. The angled shape of flange 234a can help couple the platform member 204a to a rear portion of the driver's seat and/or an angled portion of a partition assembly extending between the front occupant area and the rear occupant area. Each flange 234 can extend all or part of the way along a width or a depth of the platform member 204. For example, in the illustrated embodiment, the flanges 234 do not extend into the areas defined by the cutouts 232.

Some flanges 234 can comprise one or more apertures 236 configured to receive a fastener (e.g., a threaded fastener such as a screw or bolt) such that the platform member 204a can be coupled to other components of the partition assembly 200 (e.g., the partition member 202 and/or the drawer 206), to the vehicle 100, and/or to additional partition assemblies disposed within the vehicle. For example, in the illustrated embodiment flange 234a has three apertures 236. Some flanges 234, for example second side flange 234c can further prevent items placed in the storage area 201 from sliding off the platform member during movement of the vehicle 100 or opening of the vehicle doors.

In the illustrated embodiment, the first side flange 234b can be coupled to the partition member 202, the second side flange 234c can be coupled to the drawer 206, and the front flange 234a can be coupled to a rear portion of the driver's seat and/or to an additional partition assembly disposed between the front occupant area 104 and the rear occupant area 106.

As mentioned previously, in some embodiments, as shown in FIGS. 1 and 11-12, the partition assembly 200 can include a second platform member 204b, which is substantially similar to the first platform member 204a. As shown in FIG. 1, the platform members 204a, 204b can be spaced apart from one another vertically along the first or Z-axis. The placement of the platform members 204a, 204b can define a visible storage area 238 and an obscured storage area 240 within the storage area 201. The obscured storage area 240 can be configured to be shielded from view when the vehicle doors (e.g., the rear occupant doors such as door 116) are closed such that a person passing by the vehicle 100 and/or looking in through the vehicle windows cannot see what materials are located within the obscured storage area 240. In some embodiments, the partition member 202 can comprise an opaque or darkened portion corresponding to the location of the obscured storage area 240 such that a passenger sitting in the prisoner area 203 cannot see into the obscured storage area 240 through the partition member 202.

As mentioned previously, the partition assembly 200 can comprise one or more drawers 206. Each drawer 206 can be coupled to a lower surface (e.g., lower surface 230) of a platform member 204. For example, in the illustrated embodiment, the partition assembly 200 has one drawer 206 coupled to the lower surface 230 of the first platform member 204*a*. In other embodiments, the partition assembly can comprise various drawers. For example, in some embodiments, the obscured storage area 240 can comprise one or more additional drawers 206 disposed between the first platform member 204*a* and the second platform member 204*b*.

Referring to FIG. 11, each drawer 206 can comprise a housing 242 and a slidable member 244. The housing 242 can define a lumen 246 into which the slidable member 244 can extend. The slidable member 244 can slide relative to the housing 242 between a closed position (FIGS. 2-10) and an open position in the direction of the third or Y-axis, as shown by coordinate system 208 (see FIG. 11). The housing 242 can comprise rails 248 configured to engage corresponding rails 250 of the slidable member to facilitate movement of the slidable member 244 relative to the housing 242.

As mentioned previously, in some embodiments, the first 116 and second rear occupant doors can be opened such that they define a 90 degree or approximately 90 degree angle with the body of the vehicle, or an even greater angle, in some cases. In such embodiments, as shown in FIG. 1, the drawer 206 can be configured to extend into the open position without contacting the rear occupant door 116. For example, the drawer 206 can have a shape configured to allow the drawer 206 to be opened without interfering with the frame of the vehicle 100 or with the vehicle door 116, such as a cross-sectional shape that is substantially rectangular with one corner (e.g., corner 205 as shown in FIG. 2) removed/cut off.

Each drawer 206 can be configured to store any variety of materials and/or gear. For example, the drawer 206 can be used to store materials used during law enforcement activities, such as firearms, restraints, illuminating devices (e.g., flashlights and/or flares), communication equipment, and/or any other necessary materials.

Each drawer can further comprise a handle or gripping portion 252 configured to facilitate opening of the drawer 206. In some embodiments, such as the illustrated embodiment, the gripping portion 252 can further comprise a locking mechanism 254. The locking mechanism 254 can be configured to retain the drawer in the closed position. In other embodiments, the drawer need not include a locking mechanism.

In some embodiments, the locking mechanism 254 can comprise a rotatable member (not shown) coupled to the slidable member 244 and a locking flange 256 (see FIG. 11) coupled to the housing 242 and extending into the lumen 246. When the drawer 206 is in the closed position, a user can rotate the rotatable member such that an end portion of the rotatable member engages the locking flange 256, thus preventing the slidable member 244 from sliding relative to the housing 242. In other embodiments, the flange 256 may be mounted on the platform member 204.

Figure 4:
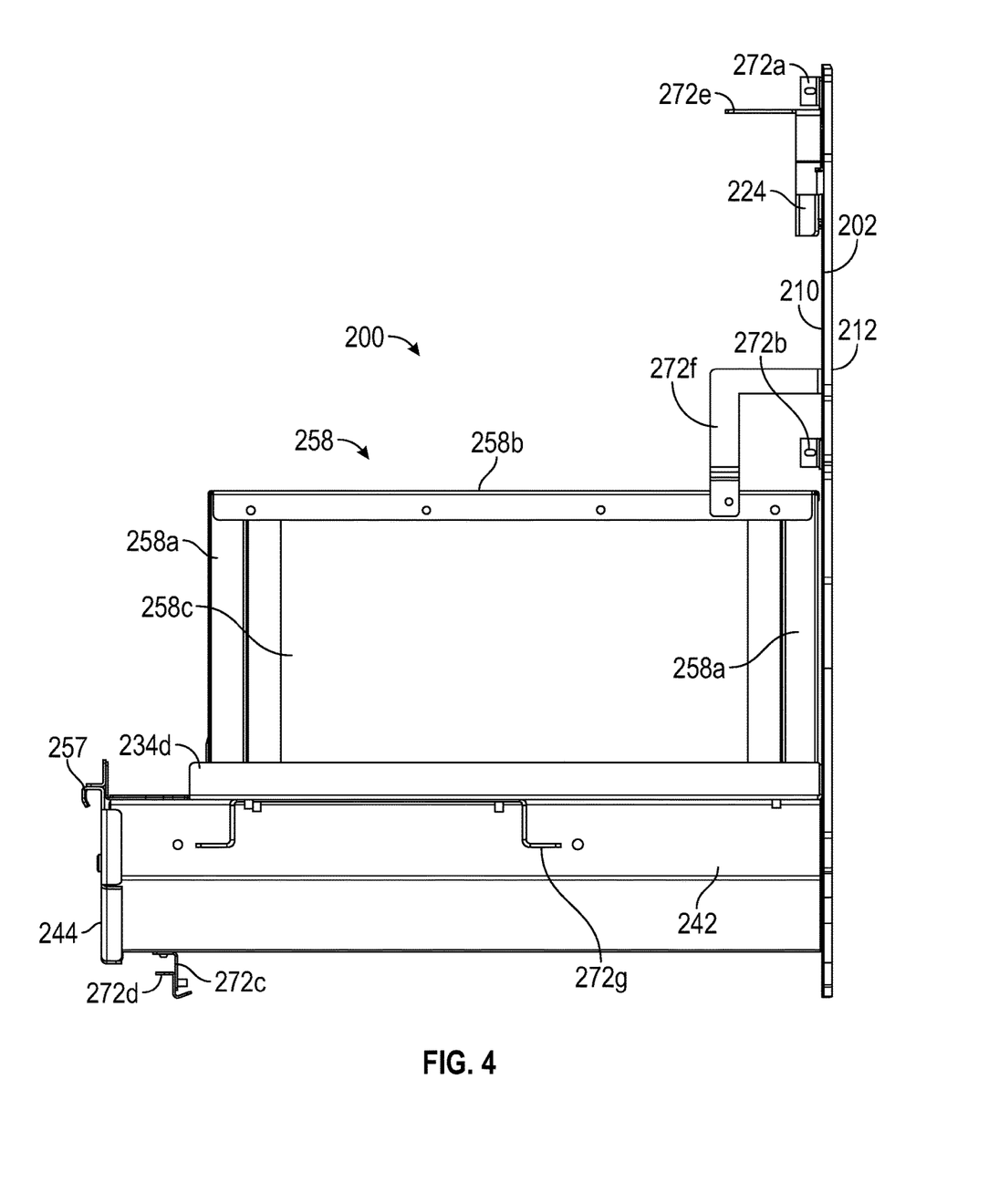
FIG. 4 is a rear view of the partition assembly of FIG. 1 with the upper platform member removed.

In some embodiments, the drawer 206 can further comprise a second gripping portion 257. The second gripping portion 257 can be, for example, a curved member extending from an upper portion of the drawer 206, as best shown in FIG. 4. A user can grip the second gripping portion 257 to actuate the slidable member 244 between the open and closed positions.

Referring again to FIG. 2, the partition assembly can further comprise a communications housing 258. In some embodiments, the communications housing 258 can be configured to house one or more communications arrays, including, for example, radio receivers and transmitters, etc. In other embodiments, the communications housing 258 can serve as an additional storage area to house any of various materials.

Figure 5:
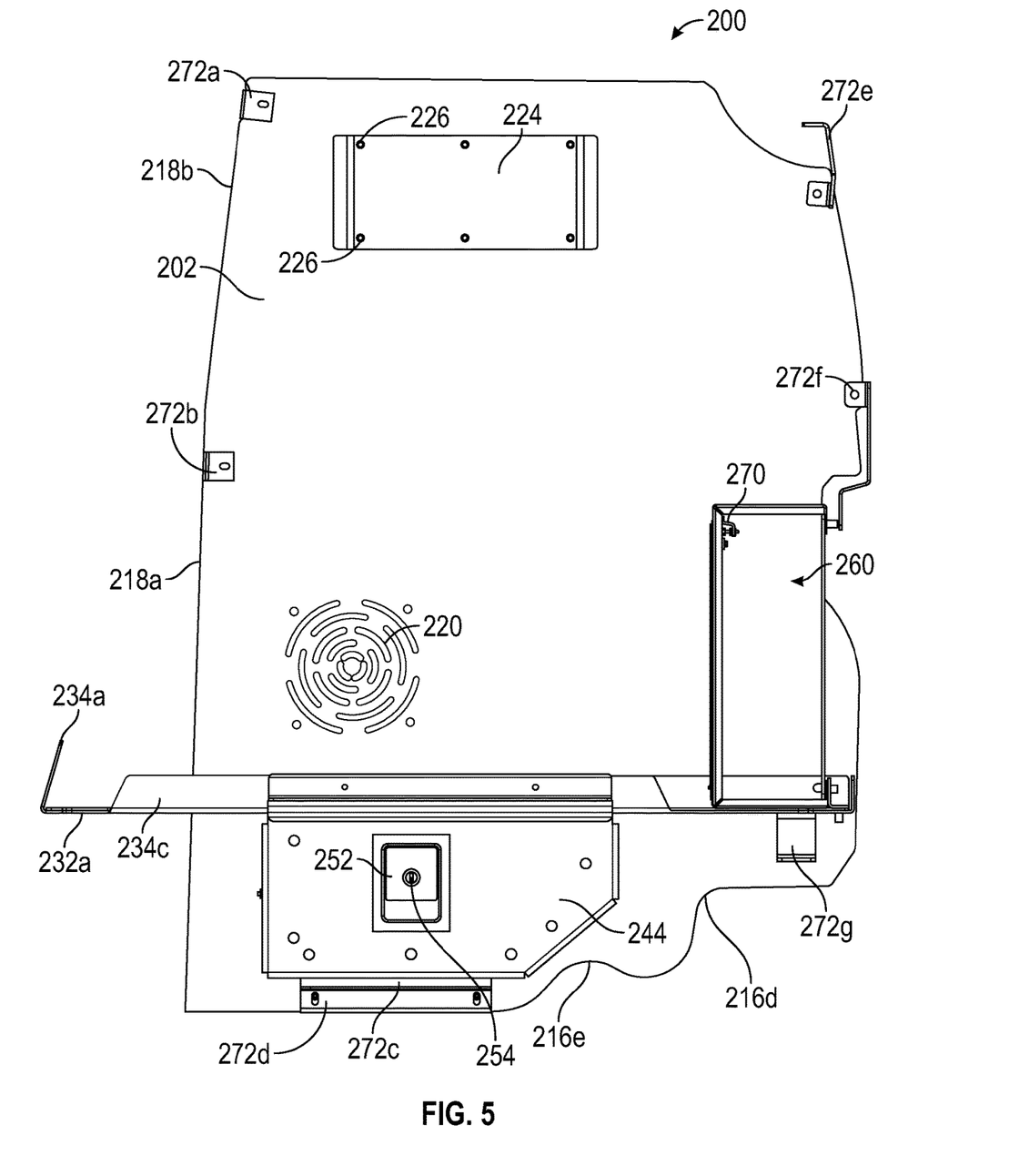
FIG. 5 is a left-side elevational view of the partition assembly of FIG. 1 with the upper platform member removed.
Figure 6:
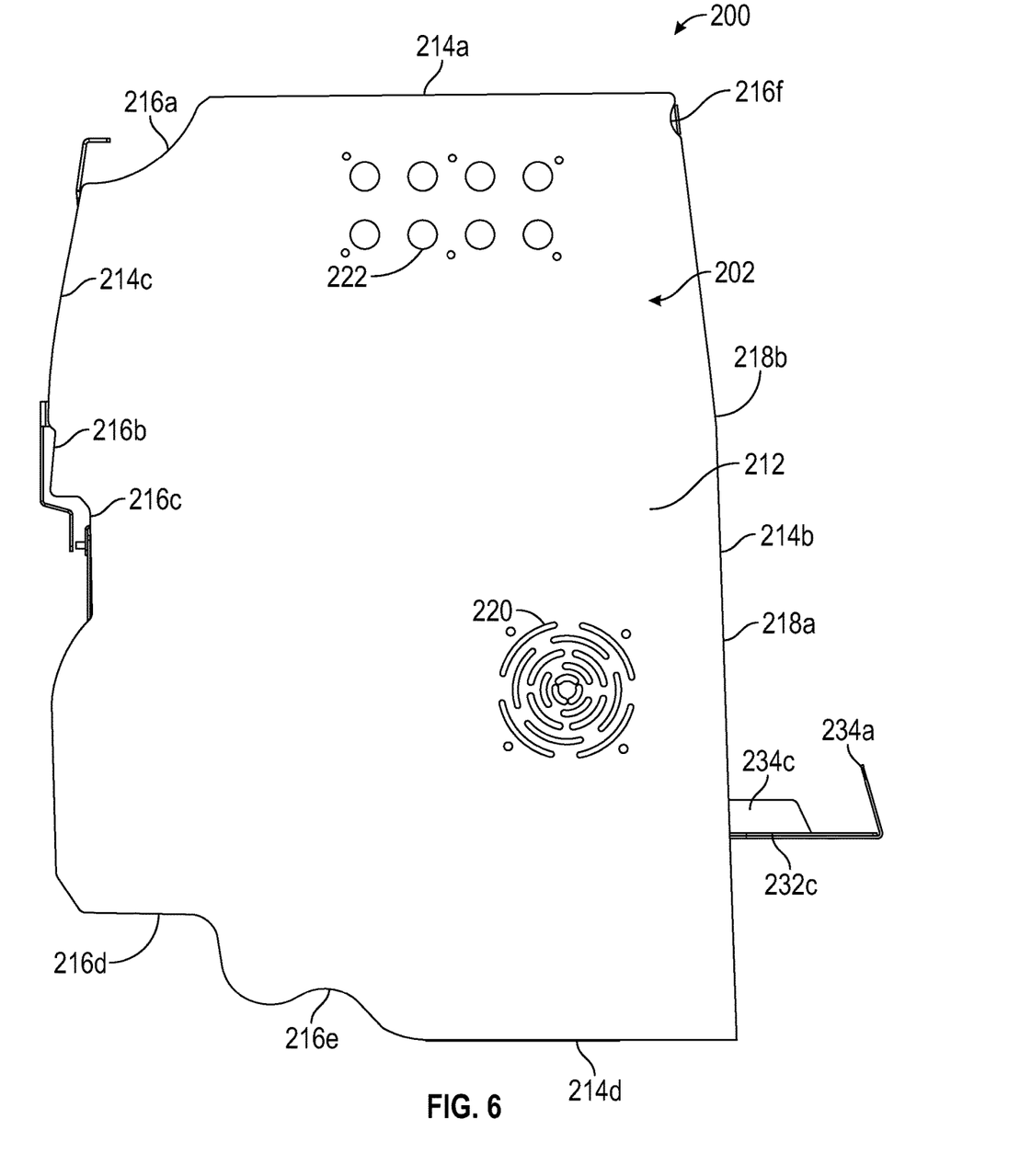
FIG. 6 is a right-side elevational view of the partition assembly of FIG. 1 with the upper platform member removed.

The communications housing 258 can comprise a first or front panel 258*a* (FIG. 3), a second or top panel 258*b* (FIG. 7), a third or rear panel 258*c* (FIG. 4), and a fourth or bottom panel 258*d* (FIG. 9). As seen in FIG. 5, the panels 258*a*-258*d* can define a communications storage area 260 between them. In some embodiments, the housing 258 need not comprise a bottom panel 258*d*, but rather can be mounted directly to a platform member 204 such that the upper surface 228 of the platform member 204 serves as the bottom panel.

Figure 3:
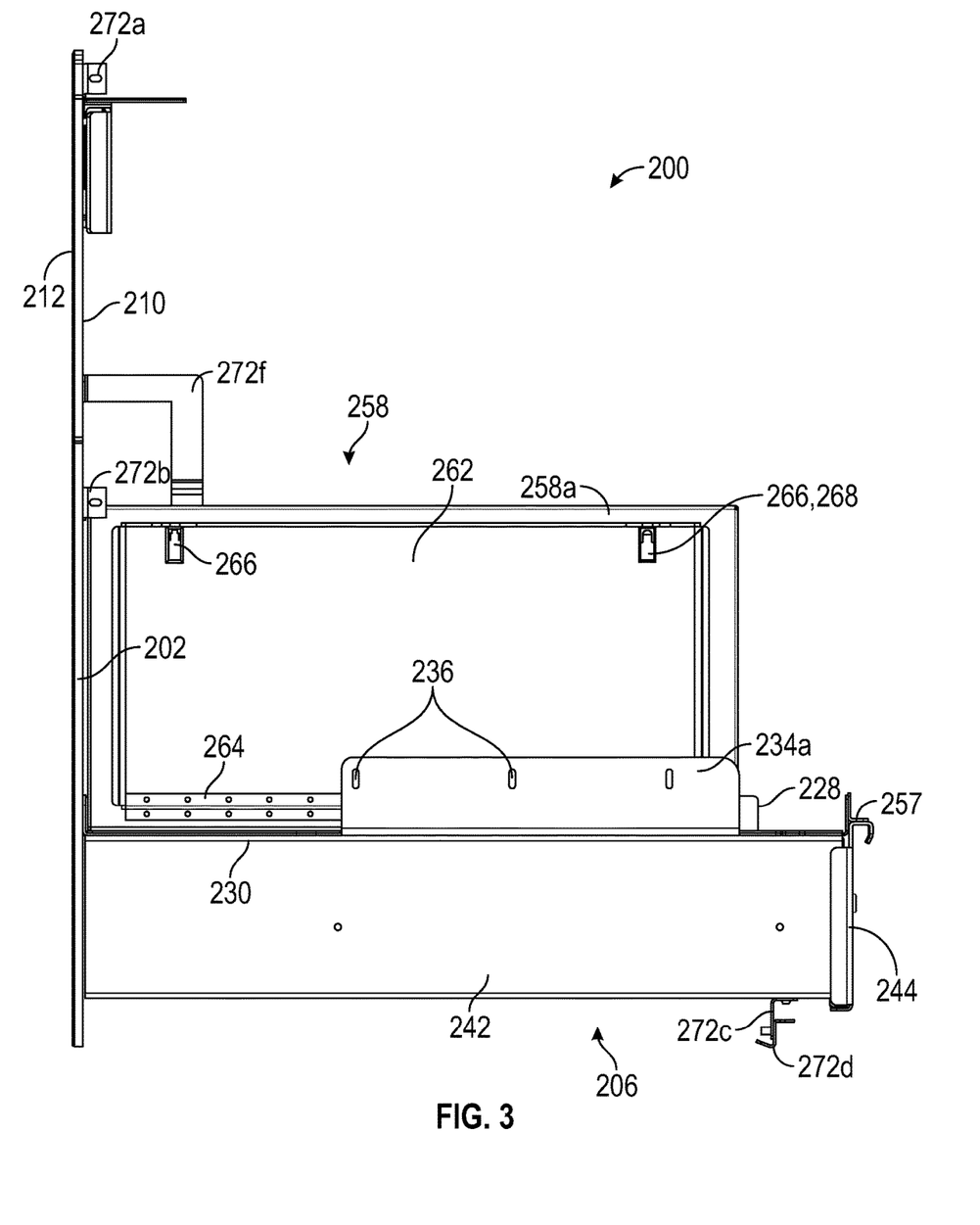
FIG. 3 is a front view of the partition assembly of FIG. 1 with the upper platform member removed.

Referring to FIG. 3, the front panel 258*a* can comprise a movable panel 262 coupled to the front panel 258*a* by one or more hinges 264. The movable panel 262 can pivot about the hinges 264 between a closed position (see FIG. 2) and an open position (not shown). When the movable panel 262 is in the open position a user can access materials located within the communications storage area 260 from the storage area 201. When the movable panel 262 is in the closed position it can prevent or mitigate access to the communications storage area 260.

The movable panel 262 can further comprise one or more locking mechanisms or latches 266 movable between a locked position and an unlocked position. In the illustrated embodiment, the movable panel 262 includes two laches 266. When in the locked position, the one or more latches 266 can be configured to engage the front panel 258*a* to retain the movable panel 262 in the closed position. When in the unlocked position, the one or more latches 266 can be disengaged from the front panel 258*a* to allow movement of the movable panel 262.

In some embodiments, each latch 266 can comprise, for example, an actuating member 268 (see FIG. 3) coupled to an engagement member 270 (see FIG. 5). When the latch 266 is in the locked position, as shown in FIG. 5, the engagement member 270 can be positioned such that it engages the front panel 258*a*, preventing or mitigating movement of the movable panel 262 into the open position.

Referring again to FIG. 2, the partition assembly 200 can be coupled to the vehicle using one or more brackets 272. Each bracket 272 can comprise one or more apertures configured to receive a respective fastener, for example, a conventional fastener such as a screw or bolt. The partition assembly 200 can comprise any number of brackets, the brackets can have any shape as needed to fit against the vehicle, and the brackets can be disposed at any location on the partition assembly, as needed, to securely couple the assembly to the vehicle.

In the illustrated embodiment, some brackets, such as brackets 272*a*, 272*b* can be conventional L-shaped brackets. Brackets, such as conventional L-shaped brackets, can further be used in combination with one or more additional brackets. For example, in the illustrated embodiment as shown in FIG. 3, an L-shaped bracket 272*c* can be coupled (e.g., via a fastener such as a screw or bolt) to bracket 272*d*.

This combination of brackets can be configured to couple the partition assembly 200 to the floor and/or side wall of the vehicle 100.

As shown in the illustrated embodiment, the partition assembly can further comprise brackets 272e and 272f, which can be configured to couple the partition assembly to the roof 124 and/or portions of the factory-installed seat assembly, respectively. The partition assembly 200 can further comprise an elongated U-shaped bracket 272g coupled to the second surface 230 of the platform member 204a and configured to couple the partition assembly 200 to portions of the factory-installed seat assembly.

The brackets 272 can be formed of any suitable material for carrying the loads transferred from the partition, such as, e.g., 3/16" to 1/4" steel plate. Although the brackets 272 are shown as single pieces, any may be formed in multiple pieces depending upon the specific requirements. The various components of the partition assembly 200 may be assembled together, coupled to the vehicle 100, and/or coupled to an additional partition assembly using conventional threaded fasteners, such as screws or bolts.

FIGS. 11-12 illustrate an exemplary partition assembly 200 installed in a vehicle 100. As mentioned previously, the partition assembly 200 illustrated in FIGS. 11-12 has a transparent or translucent partition member 202, and includes a second, upper platform member 204b. All other features are as described previously. FIGS. 11-12 omit the rear occupant area doors for purposes of illustration.

In some embodiments, in order to install the partition assembly 200, the factory-installed rear occupant seats must be removed from the vehicle 100. In such embodiments, the partition assembly can include a seat, such as seat 274 shown in FIG. 10. In other embodiments, only portions of the factory-installed occupant seats must be removed to install the partition assembly 200. For example, in some embodiments, the factory-installed rear occupant seat(s) on the driver-side of the vehicle can be removed to accommodate the storage area 201, and the factory-installed rear occupant seat(s) on the passenger-side of the vehicle can remain in the vehicle for use in the prisoner area 203.

Referring to FIG. 12, in some embodiments, the partition assembly 200 can be used in combination with a seatbelt docking device 300. The seatbelt docking device 300 can comprise a docking member 302 coupled to a portion of the vehicle. For example, in the illustrated embodiment, the seatbelt docking device 300 is coupled to an additional partition assembly such as the partition assembly shown in U.S. Pat. No. 8,708,388, via a support member 304. In other embodiments, the seatbelt docking device 300 can be coupled to the partition assembly 200, or to a portion of the vehicle frame such as a B pillar 126.

The seatbelt docking device 300 can be used in the following exemplary manner. Prior to the placement of a prisoner in the prisoner area 203, a user (e.g., a law enforcement officer) can "dock" a seatbelt, such as seatbelt 306 having a tongue portion 308 and a belt portion 310, by inserting the tongue portion 308 into the docking member 302. Once the prisoner has been placed in the prisoner area 203, the user can release the tongue portion 308 of the seatbelt, for example, by clicking a button or other release member on the docking member 302. The user can then insert the tongue portion 308 into the factory docking member 312, securing the prisoner's seatbelt in place. Use of the docking member 302 can prevent or mitigate the need for the user to reach across the prisoner in order to reach the seatbelt, thereby preventing or mitigating the risk of harm to the user by the prisoner.

General Considerations

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

All features described herein are independent of one another and, except where structurally impossible, can be used in combination with any other feature described herein.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In the following description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

In view of the many possible embodiments to which the principles of the disclosure may be applied, it should be recognized that the illustrated embodiments are only preferred examples and should not be taken as limiting the scope of the disclosure. Rather, the scope of the disclosure is defined by the following claims. We therefore claim all that comes within the scope and spirit of these claims.

We claim:

1. A partition assembly for a vehicle, comprising:
  a partition member extending along a first axis and having a first side surface and a second side surface, the partition member defining a prisoner area and a storage area closed off from the prisoner area by the partition member;

a platform member coupled to the first side surface of the partition member and extending from the partition member along a second axis perpendicular to the first axis;

a drawer coupled to the platform member, the drawer being slidable between an open position and a closed position along the second axis; and wherein the partition assembly is disposed in a rear occupant area of the vehicle such that the first axis extends along a longitudinal axis of the vehicle and the storage area and the prisoner area are defined within the rear occupant area, and such that the platform member extends toward a door of the rear occupant area.

2. The partition assembly of claim 1, wherein the platform member is a first platform member, and wherein the partition assembly further comprises a second platform member coupled to and extending from the first side surface of partition member along the second axis, the second platform member being spaced apart from the first platform member along the first axis to define an obscured storage area between them separate from the drawer.

3. The partition assembly of claim 1, further comprising a communications housing coupled to the platform member and defining an inner storage area.

4. The partition assembly of claim 3, further comprising a movable panel pivotably coupled to the communications housing, the movable panel being movable between an open position and a closed position, wherein when the movable panel is in the open position the inner storage area can be accessed.

5. The partition assembly of claim 4, wherein the movable panel comprises one or more latches configured to selectively retain the movable panel in the closed position.

6. The partition assembly of claim 1, wherein the drawer further comprises a locking mechanism configured to selectively retain the drawer in the closed position.

7. The partition assembly of claim 1, further comprising one or more flanges disposed about a perimeter of the platform member and configured to allow the partition assembly to be coupled to the vehicle via one or more fasteners.

8. The partition assembly of claim 1, wherein the partition member comprises one or more vents extending through a thickness of the partition member.

9. The partition assembly of claim 8, further comprising one or more vent covers configured to prevent a passenger seated in the prisoner area from accessing the storage area while allowing air to flow through the one or more vents between the storage area and the prisoner area.

10. The partition assembly of claim 1, wherein the platform member comprises one or more cutouts configured to allow the platform member to conform to contours of one or more interior features of the vehicle.

11. The partition assembly of claim 1, wherein the partition member comprises polycarbonate.

12. The partition assembly of claim 1, further comprising a seat portion coupled to the second side surface of the partition member.

13. The partition assembly of claim 1, wherein the drawer comprises a housing defining a lumen and a slidable member configured to extend at least partially into the lumen.

14. The partition assembly of claim 13, wherein the housing comprises a first set of rails and wherein the slidable member comprises a corresponding second set of rails configured to engage the first set of rails.

15. A partition assembly for use in a vehicle having a front occupant area and a rear occupant area and comprising a first rear area door on a driver-side of the vehicle and a second rear area door on a passenger-side of the vehicle, the first and second rear area doors being movable between a closed position and an open position, the partition assembly comprising:

a partition member configured to extend between a driver-side portion and a passenger-side portion of the rear occupant area and between a floor and a ceiling of the vehicle in a vertical direction, the partition member defining a storage area and a prisoner area;

a platform member coupled to the partition member and configured to extend horizontally from the partition member to a first side of the vehicle comprising the first rear area door, the platform member comprising one or more flanges disposed about a perimeter of the platform member and configured to allow the partition assembly to be coupled to the vehicle via one or more fasteners; and a drawer coupled to the platform member and being movable between a closed position and an open position, the drawer being configured such that when the drawer and the first rear area door are in the open position the drawer does not contact the first rear area door.

16. The partition assembly of claim 15, wherein the platform member is a first platform member and wherein the partition assembly further comprises a second platform member coupled to the partition member and spaced apart from the first platform member in the vertical direction, the second platform member configured to extend horizontally from the partition member to the first side of the vehicle, the first and second platform members defining an obscured storage area between them that extends from the partition member to the first side of the vehicle.

17. The partition assembly of claim 16, wherein the obscured storage area is a first storage area and wherein a second storage area is defined between the second platform member and the ceiling of the vehicle.

18. The partition assembly of claim 17, wherein the first storage area is positioned such that a person looking in through a window of the vehicle cannot see into the first storage area.

19. The partition assembly of claim 15, further comprising a communications housing coupled to the platform member and extending toward the ceiling of the vehicle, the communications housing defining an inner storage area.

20. The partition assembly of claim 19, wherein the communications housing further comprises a movable panel configured to move between an open position and a closed position, wherein when the movable panel is in the open position the inner storage area is accessible from an interior of the vehicle.

* * * * *